United States Patent [19]

Okuda et al.

[11] Patent Number: 4,561,888

[45] Date of Patent: Dec. 31, 1985

[54] WELDING WIRE FOR USE IN SUBMERGED ARC WELDING OF CR-MO STEELS

[75] Inventors: Naoki Okuda; Minoru Yamada; Fumito Yoshino, all of Kanagawa, Japan

[73] Assignee: Kabushiki Kaisha Kobe Seiko Sho, Kobe, Japan

[21] Appl. No.: 545,240

[22] Filed: Oct. 25, 1983

[30] Foreign Application Priority Data

Nov. 2, 1982 [JP] Japan .................. 57-192695

[51] Int. Cl.$^4$ .............................. C22C 38/44
[52] U.S. Cl. .................. 75/124; 75/126 C; 75/126 D; 75/126 F; 75/126 P; 75/126 J; 75/128 F; 75/128 N; 75/128 Z; 75/128 T; 75/128 W
[58] Field of Search ............ 148/36, 37, 12 B; 75/126 P, 126 C, 126 J, 126 D, 126 F, 128 N, 128 Z, 128 T, 128 W, 128 F, 124 B, 124 F, 124 E, 124 C; 219/85 H, 146.23, 146.41, 137 WM; 228/263.11, 263.15

[56] References Cited

U.S. PATENT DOCUMENTS

| | | | |
|---|---|---|---|
| 3,328,211 | 6/1967 | Nakamura et al. | 75/128 F |
| 3,664,830 | 5/1972 | Kambayashi et al. | 75/126 J |
| 3,847,600 | 11/1974 | Mimino et al. | 75/126 P |
| 4,068,113 | 1/1978 | Godai et al. | 219/146.23 |
| 4,436,554 | 5/1984 | Omae et al. | 148/37 |
| 4,461,811 | 7/1984 | Borneman et al. | 148/37 |

FOREIGN PATENT DOCUMENTS

| | | | |
|---|---|---|---|
| 0639642 | 3/1964 | France | 75/126 J |
| 55-50023 | 12/1980 | Japan | 75/128 F |

*Primary Examiner*—Melvyn J. Andrews
*Assistant Examiner*—Deborah Yee
*Attorney, Agent, or Firm*—Oblon, Fisher, Spivak, McClelland & Maier

[57] ABSTRACT

A welding wire for use in submerged arc welding of Cr-Mo steels comprising less than 0.25% C, less than 0.60% Si, 0.15-1.50% Mn, 0.50-10.0% Cr and 0.40-2.50% Mo on the basis of the weight ratio comprises 0.05-0.19% C, less than 0.60% Si, less than 1.6% Mn, 0.50-10.5% Cr and 0.30-2.50% Mo as the basic elements boron and nitrogen added thereto as the essential elements each in the range of 0.0001-0.25% B and 0.010-0.040% N; and at least one of titanium, zirconium and aluminum further incorporated therein each in the range of 0.01-0.30% Ti, 0.05-0.30% Zr and less than 0.40% Al, while being adjusting such that the sum of the elements: Ti+Al+Zr+10B lies within a range between 0.003-0.40% on the basis of the weight ratio. The welding wire of the novel composition can provide weld alloy steels with high strength and excellent toughness even at low temperature.

13 Claims, No Drawings

WELDING WIRE FOR USE IN SUBMERGED ARC WELDING OF CR-MO STEELS

BACKGROUND OF THE INVENTION

This invention concerns a welding wire for use in submerged arc welding of Cr-Mo steels capable of obtaining a weld metal with excellent notch toughness and high tensile strength by adding boron and nitrogen as essential elements, as well as at least one of titanium, zirconium and aluminum to the wire.

Cr-Mo steels, for example, 2½Cr - 1Mo steel and 9Cr - 2Mo steel are excellent materials of high temperature oxidation-stability and high temperature strength, and they are used in petrochemical facilities and boilers which are operated at high temperature and pressures.

However, since the circumstantial conditions for these materials have become severer in recent years, increasing demands have now been present for welding materials capable of obtaining excellent toughness at low temperature in view of the embrittlement of the materials during operation.

However, the welding materials conventionally employed so far, although having a practical performance with respect to the high temperature oxidation resistance by the control of chromium content, are still poor in tensile properties at elevated temperature including creep-rupture properties and in the notch toughness at low temperatures and can no more satisfy the recent strict demand, particularly, for the requirements of high strength and toughness.

SUMMARY OF THE INVENTION

This invention has been accomplished in view of the foregoing problems and it is an object of this invention to provide a weld metal of high strength and excellent toughness even at low temperature.

The above object can be attained according to this invention by the use of a welding wire wherein boron and nitrogen are added as the essential elements by 0.0001–0.025% B and 0.01–0.040% N respectively to the wire and at least one of titanium, aluminum and zirconium are further incorporated therein each in the range of 0.01–0.30% Ti, less than 0.40% Al and 0.05–0.30% Zr, while being adjusted such that the sum of the elements Ti+Al+Zr+10B lies within the range of between 0.003–0.40%.

DESCRIPTION FOR PREFERRED EMBODIMENTS OF THE INVENTION

The effects induced from each of the elements used in the welding wire of this invention are described below. The percentage mentioned herein means percent by weight throughout the specification.

B: 0.0001–0.025%

Boron is an element serving to improve the hardenability of a weld metal even with a slight amount and used as one of the essential elements in this invention. If the content of boron in the wire is less than 0.0001%, no desired improvement can be expected for the hardening. On the other hand, if the content exceeds 0.025%, no more improvement can be provided for the hardening effect but it rather worsens the weldability. Accordingly, the content of boron should be in a range of between 0.0001–0.025%. A particularly remarkable effect can be expected in a range from 0.0003 to 0.01% of boron.

N: 0.010–0.040%

Generally, sole addition of boron to a weld metal rather renders the crystal grains coarser to result in the lowering of the toughness. However, the combined addition of nitrogen in an appropriate amount can make the crystal grains finer, as well as provide, coupled with the inherent effect of boron for the improvement of the hardenability, more significant improvement in the toughness and the strength of the weld metal.

It should, however, be noted that the content of nitrogen in the wire in excess of 0.040% is liable to cause blow-holes in the weld metal failing to obtain an sound weld metal. Furthermore, since the nitrogen content in the weld metal somewhat varies depending on the arc voltage, its content in the wire is, desirably, less than 0.035% considering the occurrence of weld defects. On the contrary, if the content of nitrogen is less than 0.010%, it produces only a poor decreasing effect for the grain size and no substantial effect can be expected even by the combined use with boron. Accordingly, the content of nitrogen should be in a range of 0.010–0.040% and, preferably, 0.010–0.035%.

The synergistic effect of boron and nitrogen mentioned as above can be rendered more stable by the further incorporation of titanium, zirconium and/or aluminum in addition to boron and nitrogen.

Specifically, these elements Ti, Zr, Al are strong nitride formations. So, they are present in the form of TiN, ZrN or AlN serving to fix nitrogen in the weld metal. At the same time, they also exhibit the effect of rendering the crystal grain finer, as the result of which the toughness of the weld metal can be improved further.

Particularly, since the addition of titanium can improve not only the toughness but also the strength of the weld metal in the same manner as boron, it is expected to provide an excellent performance as the welding material for use in Cr-Mo steels.

Ti: 0.01–0.30%

Generally, titanium is an effective element for rendering the crystal grains finer, as well as it has effects of deoxidization and improving the tensile strength. However, if the titanium content in the wire is less than 0.01%, no intended effect can be expected for decreasing the grain size. On the contrary, if it exceeds 0.30%, the strength of the weld metal becomes excessively high. Accordingly, the titanium content in the weld metal should be in a range of between 0.01–0.30%. Furthermore, since the titanium content in the weld metal may vary depending on the contents of carbon, silicon and mangenese, the content of titanium is, preferably, more than 0.02%. Accordingly, the titanium content is, desirably, specified to a range of between 0.02–0.30%.

Al: less than 0.40%

Aluminum, like titanium, has the effects of rendering the crystal grains finer and deoxidization as well. However, if the aluminum content exceeds 0.40%, it rather worsens the toughness of the weld metal because of an excessive aluminum content solid-solubilized into the weld metal. Accordingly, the aluminum content should be of less than 0.40%. Furthermore, a desirable aluminum content in the wire is in a range of between 0.05–0.20% in view of the effect of aluminum and the workability.

Zr: 0.05–0.30%

Zirconium behaves as an effective deoxidization element. However, it shows no substantial effect by less than 0.50% and, on the other hand, too much increases the strength of a weld metal and impairs the workability in the welding if its content exceeds 0.30%.

C: 0.05–0.19%

The content of carbon in the wire impairs the weldability and increases the cracking-sensitivity of the weld metal if it exceeds 0.19%. On the other hand if the carbon content is less than 0.05%, the improving effect for the hardenability is reduced and the strength of the weld metal is remarkably decreased. Accordingly, the carbon content is generally in a range of between 0.05–0.19%. Furthermore, while the actual content of carbon in the weld metal may vary depending on the type of the flux used together with the welding wire, the carbon content is desirably of less than 0.15% in view of the cracking-resistance of the weld-metal. Accordingly, a preferred carbon content is in a range of between 0.05–0.15%.

Si: less than 0.60%

Silicon is an essential element in deoxidization of the weld metal but it remarkably reduces the toughness if the silicon contents exceeds 0.60%. Furthermore, since silicon increases the sensitivity of temper embrittlement of the weld metal, the silicon content in the wire, desirably, less than 0.20%. Accordingly, the silicon content should be less than 0.60% and, preferably, less than 0.20%.

Mn: less than 1.6%

Manganese has a similar deoxidizing effect to that of silicon but, if the manganese content exceeds 1.6%, it worsens the sensitivity of temper embrittlement particularly in 2¼Cr - 1Mo steels. Accordingly, the manganese content should be less than 1.6%. While the deoxidizing effect of manganese may somewhat vary depending on the type of the flux used together, it is desired to increase the manganese content in the welding wire to more than 0.4% in order to effectively attain the deoxidizing effect thereof. Accordingly, a preferred manganese content is in a range of between 0.4–1.6%.

Ti+Al+Zr+10B: 0.003–0.40%

Each of titanium, aluminum, zirconium and boron is an effective element for rendering the crystal grains finer and improving the hardenability. However, if the sum of Ti+Al+Zr+10B is less than 0.003%, no substantial effect can be expected therefor and, on the other hand, Ti+Al+Zr+10B exceeding 0.40% is of low practical value since it provides too much strength, decreases the yield ratio, reduces the toughness and increases the cracking sensitivity of a weld metal. Accordingly, the sum of Ti+Al+Zr+10B should be in a range of between 0.003–0.40%. In the combination with most ordinary fluxes, the sum is, preferably, in a range of between 0.003–0.30%.

Ni: 0.10–1.2%

Nickel which is generally known as an element for austenite stabilization also has an effect of improving the toughness of a weld metal. However, if the nickel content is less than 0.10%. No substantial improvement of the toughness can be expected and no desired effect can be expected for inhibiting the formation of coarse ferrite grains which causes the reduction in the strength and the toughness of a weld metal, praticularly, of 9Cr - 2Mo alloy steels.

On the contrary, if the nickel content exceeds 1.2%, it reduces the creep-strength for a long time of the weld metal thus rendering itself unsuitable as the practical welding material for heat-resistant steels. Accordingly, the nickel content should be in a range of between 0.10–1.2%.

V: 0.01–0.3%

Vanadium is a highly effective element to improve the elevated temperature strength and the creep strength of a weld metal as well as improves the hardenability and the notch toughness of the weld metal even with the addition of a slight amount. While the effects are particularly remarkable with the vanadium content of more than 0.01%, the notch toughness is rather worsened of the content exceeds 0.3%. Accordingly, the vanadium content should be in a range of between 0.01–0.3%.

Nb: 0.01–0.3%

Niobium can improve the elevated temperature strength and the creep strength of a weld metal with a slight amount of addition as low as 0.01% like that vanadium.

However, if niobium is added in excess of 0.3%, it produces coarse ferrite grains in the weld metal and worsens the notch toughness thereof. Accordingly, the niobium content should be in a range of between 0.01–0.3%.

In this invention at least one of vanadium and niobium may be added, and they have a synergistic effect for improving the elevated temperature strength and the creep strength of the metal. Consequently, combinec use of them can provide a particularly significant effect. However, if the sum of the vanadium and niobium contents exceeds 0.4%, it remarkably worsens the notch toughness. Accordingly, the sum of the vanadium and niobium content should be in the range of between 0.01–0.4%.

Each of the foregoing elements is effective within the specified range of chromium and molybdenum contents and the effect thereof can be expected generally as a welding wire for use in each types of steels such as 1¼Cr - 0.5Mo steel, 2¼Cr - 1Mo steel, 3Cr - 1Mo steel, 5Cr - 0.5Mo steel, 9Cr - 1Mo steel and 9Cr - 2 Mo steel.

Cr: 0.5–10.5%

Chromium in the wire is particularly effective for improving the oxidizing resistance in elevated temperature and the corrosion resistance, and it is an essential element for the weld metal of ferritic structure as in this invention. However, if the chromium content goes less than 0.5%, oxidizing resistance and corrosion resistance in elevated temperature are suddenly reduced. On the contrary, if the content exceeds 10.5%, it excessively increases the hardeness of a weld metal and no essential improvement of the toughness can be expected in the case of using a wire according to this invention. Accordingly, the chromium content should be in a range of between 0.5–10.5%.

Mo: 0.3–2.5%

Molybdenum in the wire is effective to improve the high temperature strength and the creep strength of a weld metal. Further, it is an element for ferrite stabilization and softens the weld metal as it is welded to improve the crack-resistance, for example, in 9Cr - 2Mo alloy weld metal. However, the molybdenum content of less than 0.3% is not sufficient for the improvement of the creep strength in the weld metal and, on the other hand, the content in excess of 2.5% excessively increases the delta ferrite amount in the microstructure of the weld metal prepared by the use of a wire according to this invention to result in the reduction for the creep strength and the crack-resistance. Accordingly, the molybdenum content is in a range of between 0.3–2.5%.

The molybdenum content from 0.4 to 2.0% is particularly effective and remarkable effects can be expected in the case of using a wire according to this invention.

Examples of this invention and Comparative Examples are set forth in Table 1. Test results are shown for each type of steels including 1¼Cr - 0.5Mo, 2¼Cr - 1Mo, 3Cr - 1Mo, 5Cr - 0.5Mo, 9Cr - 1Mo and 9Cr - 2Mo. Weld metals having satisfactory toughness and high strength after stress releaving annealing (SR) can be obtained from any one of the steels by the use of wires within the scope of this invention.

TABLE 1

| | Wire No. | Kind of Steel | Chemical Composition of the wire (wt %) | | | | | | | | | Mechanical property | | | | | |
|---|---|---|---|---|---|---|---|---|---|---|---|---|---|---|---|---|---|
| | | | C | Si | Mn | Cr | Mo | Ti | Al | B | N | Tensile Strength at room temperature | | | Impact value* (kgf·m) 2 mmV 0°C | PWHT (SR) °C. × hr |
| | | | | | | | | | | | | 0.2% Offset Strength (kgf/mm²) | Tensile strength (kgf/mm²) | Elongation | | |
| Example | W 1 | 1¼Cr—0.5Mo | 0.10 | 0.07 | 0.60 | 1.50 | 0.52 | 0.09 | — | 0.0005 | 0.018 | 50 | 62 | 25 | 22 | 650 × 10 |
| | 2 | 2¼Cr—1Mo | 0.12 | 0.05 | 0.60 | 2.40 | 1.05 | — | 0.12 | 0.0004 | 0.020 | 47 | 58 | 27 | 20 | 690 × 7 |
| | 3 | 3Cr—1Mo | 0.11 | 0.08 | 0.70 | 3.10 | 1.03 | 0.05 | 0.10 | 0.0005 | 0.015 | 50 | 60 | 26 | 21 | " |
| | 4 | 5Cr—0.5Mo | 0.09 | 0.12 | 0.60 | 5.44 | 0.54 | 0.20 | — | 0.0003 | 0.014 | 55 | 64 | 24 | 18 | 720 × 1 |
| | 5 | 9Cr—2Mo | 0.12 | 0.10 | 1.20 | 9.60 | 1.02 | 0.15 | Ni 0.70 | 0.0006 | 0.013 | 60 | 71 | 24 | 14 | 720 × 10 |
| | 6 | " | 0.11 | 0.11 | 1.24 | 9.55 | 2.00 | 0.12 | Al 0.05 | 0.0003 | 0.012 | 57 | 69 | 25 | 16 | " |
| Comparative Example | W 7 | 2¼Cr—1Mo | 0.11 | 0.16 | 0.55 | 2.40 | 1.05 | 0.15 | — | — | — | 47 | 59 | 26 | 11 | 690 × 7 |
| | 8 | 5Cr—0.5Mo | 0.09 | 0.18 | 0.59 | 5.38 | 0.52 | — | — | — | — | 52 | 61 | 25 | 7 | 720 × 1 |
| | 9 | 9Cr—1Mo | 0.10 | 0.12 | 0.64 | 9.32 | 1.04 | — | — | — | — | 50 | 62 | 26 | 7 | 720 × 10 |
| | 10 | 9Cr—2Mo | 0.12 | 0.15 | 1.19 | 9.40 | 2.06 | — | — | — | — | 53 | 65 | 26 | 8 | " |

Flux used: highly basic CaO—SiO₂—Al₂O₃ flux

*Average value for 3 specimens

| | Wire No. | Kind of Steel | Chemical Composition of the wire (wt %) | | | | | | | Chemical Composition of the Flux (wt %) | | | | | Mechanical property | | | | |
|---|---|---|---|---|---|---|---|---|---|---|---|---|---|---|---|---|---|---|---|
| | | | C | Si | Mn | Cr | Mo | | | CaO | SiO₂ | Al₂O₃ | B₂O₃ | N | Tensile Strength at room temperature | | | Impact value (kgf·m) 2 mmV 0°C | PWHT (SR) °C. × Hr Remark |
| | | | | | | | | | N | | | | | | 0.2% offset strength kgf/mm² | Tensile strength (kgf/mm²) | Elongation (%) | | |
| Example | W 11 | 1¼Cr—0.5Mo | 0.10 | 0.08 | 0.60 | 1.47 | 0.50 | B 0.0003 | Al 0.10 Ni 0.50 | 0.017 | 30 | 27 | 14 | 2 | 27 | 52 | 61 | 26 | 20 | 670 × 3 |
| | 12 | 2¼Cr—1Mo | 0.12 | 0.04 | 0.60 | 2.44 | 1.01 | Ti 0.05 | B 0.0005 Al 0.10 | 0.010 | " | " | " | " | " | 50 | 60 | 25 | 19 | 720 × 2 |
| | 13 | 9Cr—1Mo | 0.10 | 0.10 | 0.59 | 9.33 | 1.01 | Ti 0.09 | B 0.0009 | 0.015 | " | " | " | " | " | 54 | 67 | 25 | 17 | 730 × 6 |
| | 14 | 9Cr—2Mo | 0.10 | 0.09 | 0.89 | 9.37 | 1.98 | Ti 0.01 | B 0.001 | 0.018 | " | " | " | " | " | 56 | 67 | 26 | 18 | " |
| | 15 | 9Cr—2Mo | 0.11 | 0.10 | 0.92 | 9.44 | 2.02 | Zr 0.10 | B 0.001 | 0.010 | " | " | " | " | " | 57 | 69 | 25 | 16 | " |
| | 16 | 2¼Cr—1Mo | 0.12 | 0.03 | 0.58 | 2.27 | 1.02 | Ti 0.08 | B 0.004 | " | " | " | " | " | 29 | 50 | 62 | 26 | 20 | 690 × 8 |
| | 17 | 1¼Cr—0.5Mo | 0.12 | 0.08 | 0.87 | 1.67 | 0.54 | Ti 0.02 | B 0.003 | 0.029 | " | " | " | " | 29 | 45 | 58 | 28 | 18 | 650 × 30 |
| | 18 | 1¼Cr—0.5Mo | 0.11 | 0.02 | 0.62 | 1.43 | 0.56 | Ti 0.09 | B 0.002 | 0.019 | " | " | " | " | " | 48 | 59 | 31 | 24 | 650 × 30 |
| | 19 | 1¼Cr—0.5Mo | 0.11 | 0.04 | 0.59 | 1.55 | 0.55 | Ti 0.02 | B 0.0045 | 0.014 | " | " | " | " | " | 49 | 61 | 29 | 19 | " |
| | 20 | 2¼Cr—1Mo | 0.12 | 0.02 | 0.61 | 2.38 | 1.09 | Al 0.10 | B 0.001 | 0.031 | " | " | " | " | " | | | | | |
| Comparative | 22 | 2¼Cr—1Mo | 0.12 | 0.03 | 0.64 | 2.33 | 1.03 | — | B 0.004 | 0.05 | " | " | " | " | 29 | 51 | 65 | 19 | 10 | 690 × 10 blow hole developed |

TABLE 1-continued

| | Wire No. | Steel | C | Si | Mn | Cr | Mo | Ti | Al | B | | | | | | | | PWHT (SR) °C. × Hr | |
|---|---|---|---|---|---|---|---|---|---|---|---|---|---|---|---|---|---|---|---|
| tive Example | 23 | 9Cr—1Mo | 0.10 | 0.10 | 0.59 | 9.28 | 1.02 | Ti 0.15 | | B 0.03 | | | 0.019 | | | | 29 | 57 | 76 | 16 | 9 | 720 × 10 | crater crack developed |
| | 24 | 9Cr—2Mo | 0.11 | 0.10 | | 0.88 | 9.31 | 2.05 | — | | Al 0.33 | | 0.008 | | 28 | 46 | 59 | 33 | 11 | " | " | bead crack developed |
| | 25 | " | 0.10 | 0.13 | 0.84 | 9.24 | 2.00 | Ti 0.26 | Al 0.18 | | 0.018 | | 28 | 63 | 79 | 12 | 10 | | | Ti+Al+Zr+10B =0.64 |
| | 26 | 2¼Cr—1Mo | 0.12 | 0.07 | 0.70 | 2.40 | 1.03 | | | Zr 0.20 Al B 0.0001 0.001 | 0.019 | | — | 29 | 48 | 54 | 26 | 15 | 690 × 27 | Ti+Al+Zr+10B =0.002 |
| | 27 | 9Cr—2Mo | 0.10 | 0.10 | 0.85 | 9.40 | 1.88 | | | B Ti Zr 0.0001 0.28 0.20 | 0.024 | | — | " | 67 | 84 | 11 | 2 | 720 × 4 | bead crack developed Ti+Al+Zr+10B=0.481 |
| | 28 | " | 0.10 | 0.11 | 0.82 | 9.24 | 2.01 | 0.0001 | 0.001 | — | 0.015 | | — | " | 45 | 58 | 25 | 12 | " | Ti+Al+Zr+10B =0.002 |

| | | | Chemical Composition of the wire (wt %) | | | | | | | | | | | Tensile Strength at room temperature | | | Mechanical property | | Creep rupture | |
|---|---|---|---|---|---|---|---|---|---|---|---|---|---|---|---|---|---|---|---|---|
| | | | | | | | | | | | | | | 0.2% offset strength (Kgf/mm²) | Tensile strength (Kgf/mm²) | Elongation | Impact value* (kgf · m) 2 mmV 0° C. | PWHT (SR) °C. × Hr | Test temperature (°C.) | Creep rapture strength (Kgf/mm²) |
| | Wire No. | Steel | C | Si | Mn | Cr | Mo | Ti | Al | B | | N | | | | | | | | |
| Example | 29 | 1¼Cr—0.5Mo | 0.10 | 0.18 | 0.62 | 1.52 | 0.52 | 0.02 | 0.01 | 0.0001 V 0.01 | | 0.022 | | 52 | 62 | 28 | 20 | 650 × 3 | 550 | 20.0 |
| | 30 | 2¼Cr—1Mo | 0.13 | 0.11 | 0.60 | 2.51 | 1.05 | 0.004 | 1.11 | 0.0001 V 0.06 | | 0.022 | | 54 | 67 | 25 | 12 | 690 × 8 | " | 21.0 |
| | 31 | 2¼Cr—1Mo | 0.12 | 0.09 | 0.57 | 2.52 | 1.03 | 0.005 | 0.09 | 0.018 V 0.008 | | 0.018 | | 53 | 64 | 28 | 16 | " | " | 19.0 |
| | 32 | 9Cr—1Mo | 0.11 | 0.07 | 0.96 | 9.22 | 0.98 | 0.05 | — | 0.0001 | | 0.022 Nb 0.03 | | 63 | 72 | 24 | 9 | 720 × 5 | 550 | 25.5 |
| | 33 | 9Cr—2Mo | 0.10 | 0.09 | 1.03 | 9.18 | 2.02 | 0.08 | — | V 0.18 0.002 | | 0.012 Nb 0.04 | | 61 | 70 | 23 | 10 | " | 600 | 16.5 |
| | 34 | 9Cr—1Mo | 0.11 | 0.10 | 1.07 | 9.20 | 0.98 | 0.07 | — Ni 0.67 | V 0.15 0.0001 V 0.17 | | 0.013 Nb 0.03 | | 64 | 74 | 24 | 11 | " | 550 | 26.0 |

Flux used: highly basic CaO—SiO₂—Al₂O₃ flux.

*Average value for 3 specimens

Description for Comparative Examples in Table 1

W7: is an example of 2¼Cr - 1Mo steel which does not contain boron and niobium of this invention and exhibits insufficient toughness.

W8–10: contains none of titanium, aluminum, boron, zirconium and nitrogen as the elements defined in this invention, can not provide a sufficient strength and have poor toughness.

W22: is an example of 2¼Cr - 1Mo which contains nitrogen in excess of the range defined in this invention and results in generation of blow holes in the weld metal.

W23: contains boron in excess of the range defined in this invention, shows no improvement in the toughness and tends to result in cracks in the bead crater.

W24: contains no sufficient nitrogen as compared with this invention and shows no substantial improvement with the toughness.

W25, 27: contains the sum of Ti+Al+Zr+10B in excess of 0.40%, that is, the upper limit of this invention, has too much strength and reduced elongation and toughness. Beads are liable to crack.

W26, 28: contains boron within the range as defined in this invention but the sum of Ti+Al+Zr+10B is lower than 0.002%. They show poor strength and not yet sufficient toughness although the latter is somewhat improved as compared with W7 or W10 in which these elements are not added within the range specified in this invention.

What is claimed is:

1. A welding wire for use in submerged arc welding of Cr-Mo steels comprising, in weight percent, less than 0.25% C, less than 0.60% Si, 0.15–1.50% Mn, 0.50–10.0% Cr, 0.40–2.50% Mo and the balance Fe, Wherein the welding wire consists essentially of, in weight percent, 0.05–0.19% C, less than 0.60% Si, less than 1.6% Mn, 1.43–10.5% Cr and 0.30–2.50% Mo as the basic elements, Boron and nitrogen being incorporated to said wire as essential elements each in the range of 0.0001–0.025% B and 0.010–0.040% N; and at least one of titanium, zirconium and aluminum further incorporated therein each in the range of 0.01–0.30% Ti, 0.05–0.30% Zr and less than 0.40% Al, while being adjusted such that the sum of the elements Ti+Al+Zr+10B lies within a range between 0.003–0.40% and, the balance Fe.

2. The welding wire as defined in claim 1, wherein 0.1–1.2% Ni is added to the welding wire.

3. The welding wire as defined in claim 1 or 2, wherein at least one of 0.01–0.3% V and 0.01–0.3% Nb are added and the sum of V+Nb is adjusted to 0.01–0.4%.

4. The welding wire as defined in claim 1 which contains 0.05–0.15% C.

5. The welding wire as defined in claim 1 which contains less than 0.20% Si.

6. The welding wire as defined in claim 1 which contains 0.4–1.6% Mn.

7. The welding wire as defined in claim 1 which contains 1.43–9.5% Cr.

8. The welding wire as defined in claim 1 which contains 0.4–2.0% Mo.

9. The welding wire as defined in claim 1 which contains 0.0003–0.01% B.

10. The welding wire as defined in claim 1 which contains 0.010–0.035% N.

11. The welding wire as defined in claim 1 which contains 0.02–0.30% Ti.

12. The welding wire as defined in claim 1 which contains 0.05–0.20% Al.

13. The welding wire as defined in claim 1 in which the sum of Ti+Al+Zr+10B lies within a range between 0.003–0.30%.

* * * * *